Jan. 16, 1962 V. N. ALBERTSON ETAL 3,016,841
FLUID SUPPLY MEANS AND DRIVE THEREFOR
FOR PARTS WASHERS AND THE LIKE
Filed Nov. 3, 1960 2 Sheets-Sheet 1
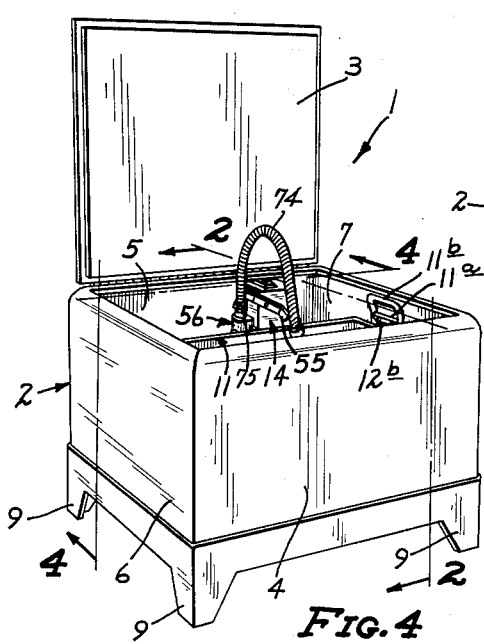
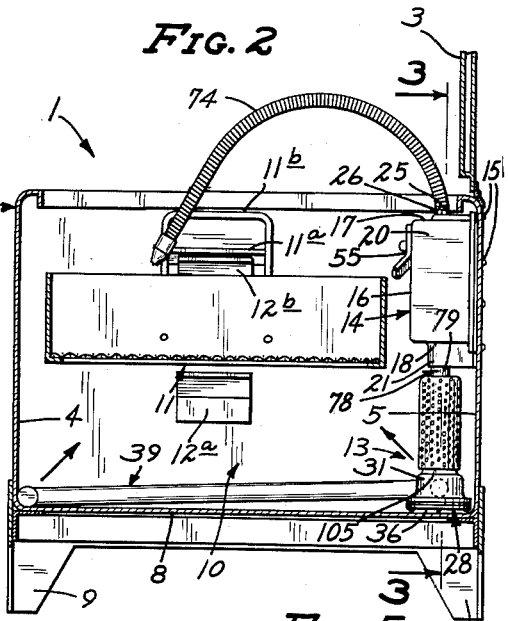
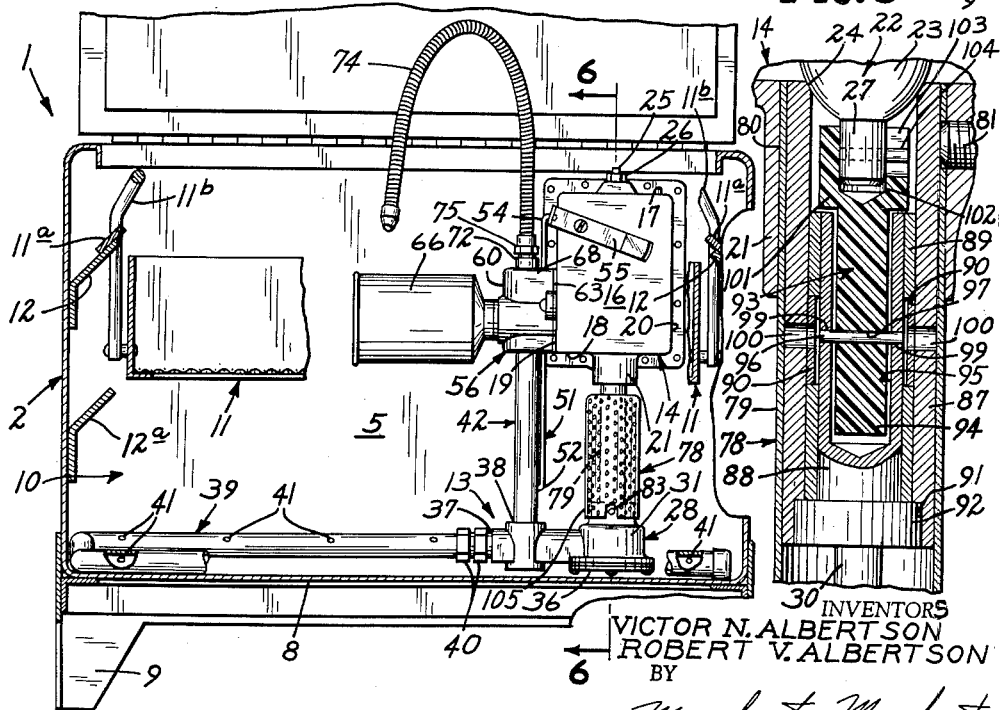
INVENTORS
VICTOR N. ALBERTSON
ROBERT V. ALBERTSON
BY
Merchant & Merchant
ATTORNEYS

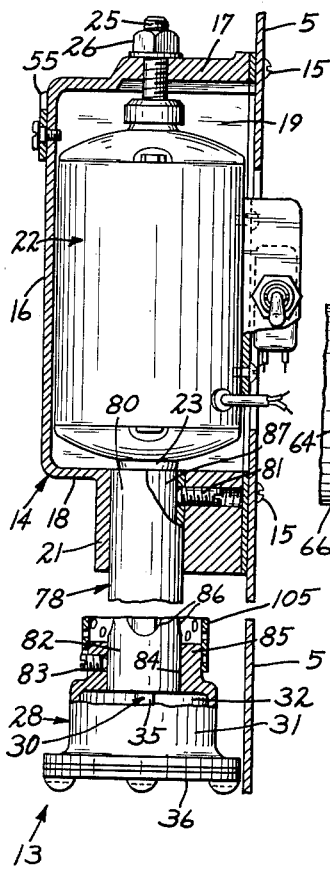
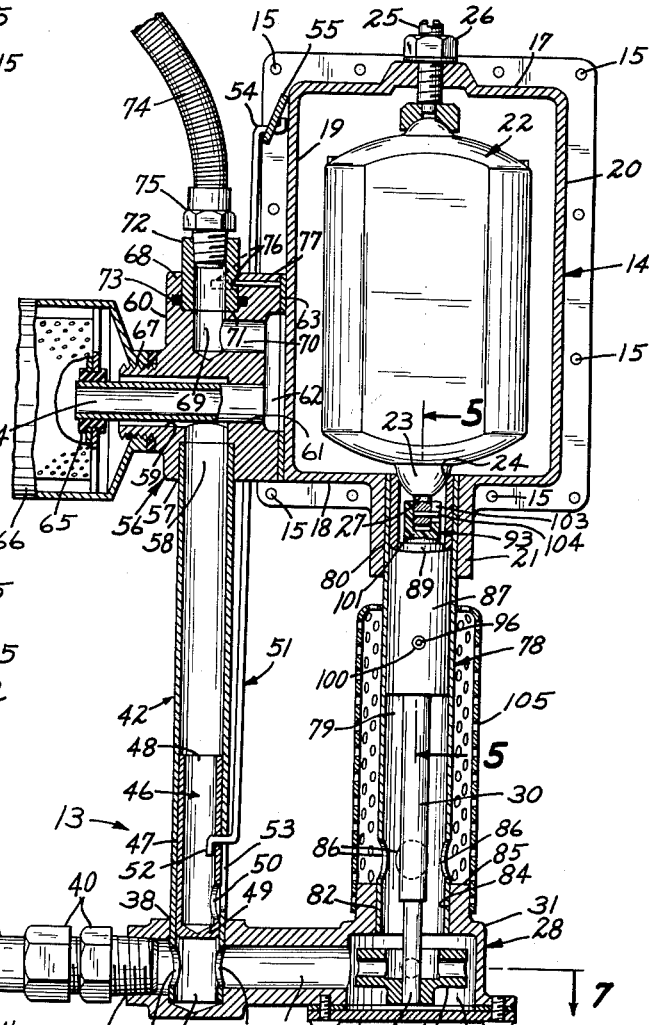
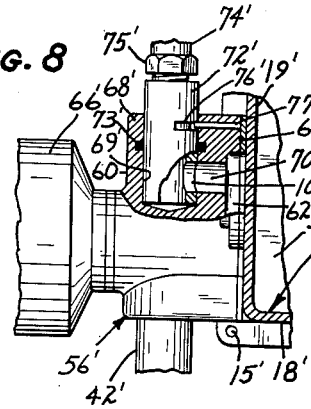
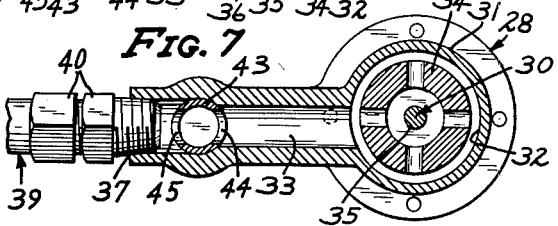

United States Patent Office 3,016,841
Patented Jan. 16, 1962

3,016,841
FLUID SUPPLY MEANS AND DRIVE THEREFOR FOR PARTS WASHERS AND THE LIKE
Victor N. Albertson and Robert V. Albertson, Minneapolis, Minn., assignors, by mesne assignments, to Practical Mfg. Co., Minneapolis, Minn., a corporation of Minnesota
Filed Nov. 3, 1960, Ser. No. 66,949
3 Claims. (Cl. 103—87)

This invention relates generally to parts washers for cleaning and washing machinery parts, and more particularly it relates to the improvement of fluid supply means for said parts washers.

Generally, this invention comprises an open-topped cabinet which is adapted to receive dirty machinery parts and alternately wash and rinse them with a cleaning solution, in combination with an improved fluid supply means for said parts washer, said fluid supply means including a pump, a drive motor, and flexible coupling means interposed between the shafts of the pump and drive motor.

Parts washers of the type described are commonly provided with electric motors for driving rotary pumps used to recirculate the cleaning fluid used in the parts washers. In light of the varied size and weight of machinery parts which are usually cleansed by such a machine, coupled with the hard and obnoxious treatment usually imparted to such washers by the cleansing of the machinery parts which they are adapted to receive, it has been a difficult problem to provide fluid supply means for the parts washers in which pump drive motors could be mounted satisfactorily to insure generally coaxial alignment of the pump drive shaft and the output shaft of the pump driving motor. The above should be considered in light of the fact that general coaxial alignment of the shafts of the pump and motor is more or less critical if proper operation of the parts washer and the fluid supply means therefor is to be maintained and the various parts of the fluid supply means are to have sufficiently long useful lives.

In recognition of the above considerations, an important object of this invention is the provision of fluid supply means and drive therefor for parts washers and the like which is adapted to maintain a more or less substantial connection between the shafts of the pump and driving motor of the parts washer, and at the same time compensate for any axial misalignment between both of the shafts.

Another object of this invention is the provision of fluid supply means and drive therefor for parts washers and the like which is adapted to function properly and have a long useful life in light of the normally hard and obnoxious use to which parts washers are usually put.

A still further object of this invention is the provision of fluid supply means and drive therefor for parts washers and the like, including flexible coupling means, which will provide satisfaction of the above objects and do so at a very economical level of manufacturing cost.

The above and still further objects of this invention will become apparent from the following detailed specification, appended claims and attached drawings.

Referring to the drawings, wherein like reference characters indicate like parts or elements throughout the several views:

FIG. 1 is a view in perspective of my invention;
FIG. 2 is an enlarged view in vertical section taken on the line 2—2 of FIG. 1, some parts being broken away;
FIG. 3 is a further enlarged view in vertical section taken on the line 3—3 of FIG. 2, some parts being broken away;
FIG. 4 is an enlarged view in vertical section taken on the line 4—4 of FIG. 1, some parts being broken away;
FIG. 5 is a greatly enlarged view in vertical section taken on the line 5—5 of FIG. 3, some parts being broken away;
FIG. 6 is a further enlarged view in vertical section taken on the line 6—6 of FIG. 4, some parts being broken away;
FIG. 7 is a view in horizontal section taken on the line 7—7 of FIG. 3; and
FIG. 8 is an enlarged view of an alternative embodiment of a portion of FIG. 6, some parts being broken away and some parts shown in section.

Referring with greater particularity to the drawings, the reference numeral 1 represents a parts washer in its entirety, which is contained within and includes the open-topped cabinet, represented in general by the reference numeral 2. The cabinet 2 comprises a hinged top 3, a front wall 4, a back wall 5, end walls 6, 7, a bottom wall 8, and depending legs 9 for supporting the cabinet 2 in the conventional manner. The front wall 4, back wall 5, end walls 6, 7, and bottom wall 8 of the cabinet 2 define a cleansing tank 10, which is adapted to contain a cleaning solution, not shown, which may be of any conventional type used in removing carbon, grease, grime, et cetera.

As seen particularly in FIGS. 2 and 4, a foraminous basket 11 is suspended within the tank 10 by engagement of flanges 11a on the handles 11b thereof with selected pairs of upper and lower hooks 12 and 12a respectively in the tank 10.

For the purpose of recirculating the cleaning solution, not shown, within the parts washer 1, fluid supply means, represented in general by the reference numeral 13, is provided the fluid supply means 13 being the structure to which the present invention relates and is in the nature of an improvement upon. In accordance with my invention, a rigid generally box-like motor housing, represented in general by the reference numeral 14 is secured in an upwardly spaced position to the back wall 5 of the cabinet 2 by means of a plurality of marginally spaced fasteners 15. The motor housing 14 has a front wall 16, a top wall 17, a bottom wall 18, and side walls 19, 20, the back thereof being open, as seen particularly in FIG. 6. The bottom wall 18 of said motor housing 14 defines a depending journal enclosure 21. An electric motor 22 is enclosed within and rigidly secured to the motor housing 14, said motor 22 being partially secured by means of the seating of the annular shaft closure 23 against the annular seat 24. The motor 22 is further secured within the motor housing 14 by means of the cup-equipped bolt 25 which is screw threaded within the top wall 17 of the motor housing 14 and locked with the nut 26. The motor 22 has a generally vertically depending output shaft 27 which is generally axially received within the upper end of the journal enclosure 21, as seen in FIGS. 3 and 5.

A rotary pump, represented in general by the reference numeral 28, is disposed within the cleansing tank 10, near the bottom wall 8 thereof, and is adapted to recirculate the cleaning fluid, not shown, within the parts washer 1 in a manner which will be hereinafter described. The pump 28 has an elongated and upstanding drive shaft 30, the axis of which is generally but not necessarily definitely aligned with the axis of the motor output shaft 27. The pump 28 comprises a rigid housing 31 which defines an inner impeller-enclosing chamber 32 and a lateral fluid outlet passage 33. The annular pump impeller 34 is rigidly secured to the lower end 35 of the pump drive shaft 30, both of which are inserted through the bottom of the pump housing 31 and enclosed therein by the removably secured closure plate 36.

With reference to FIG. 3, it is noted that the lateral outlet passage 33 of the pump housing 31 defines a lateral orifice 37 and an upwardly opening orifice 38. An elongated generally U-shaped distribution tube 39 is connected by suitable couplings 40 to the lateral orifice 37 of the pump outlet passage 33 (see FIGS. 2 and 4). The distribution tube 39 is provided with longitudinally spaced outlet apertures 41, which direct the cleaning fluid, not shown, in an upward direction toward the basket 11, as illustrated by the arrows in FIG. 2. Referring again to FIG. 3, an upstanding rigid conduit 42 is received and secured at its lower end 43 within the upper orifice 38 of the pump outlet passage 33. The lower end 43 of the conduit 42 extends generally diametrically of the fluid outlet passage 33 and is seated against the lower portion thereof. Also, the lower end 43 of the conduit 42 defines opposed apertures 44, 45 which are generally axially aligned with the axis of the outlet passage 33 and the lateral orifice 37. For the purpose of controlling the flow of cleaning fluid alternately through the distribution tube 39 and the conduit 42, a valve 46 is provided. The valve 46 comprises a generally tubular valve element 47 which has an open upper end 48 and a closed lower end 49. The valve element 47 is axially slidably received within the conduit 42 and is movable between an upper position spaced above the pump outlet passage 33, as shown in FIG. 3, to a lower position adjacent the lower end 43 of the conduit 42 wherein the lateral opening 50 defined adjacent the lower end 49 of the valve element 47 is spaced adjacent and generally axially aligned with the aperture 44 defined in the lower end 43 of the conduit 42. The upper position of the valve 46 permits flow of the cleaning fluid, not shown, straight through the pump outlet passage 33 into the distribution tube 39, as shown in FIG. 3, and the lower position of the valve 46 permits flow of the cleaning fluid, not shown, upwardly through the valve element 47 and the conduit 42. The valve 46 is actuated between its upper and lower positions by means of an elongated valve control rod 51, the lower end 52 of which is connected to upper end 48 of the valve element 47 adjacent the vertically extending slot 53 defined in the conduit 42, the upper end 54 of the rod 51 is connected to the control lever 55 which is pivotally secured to the front wall 16 of the motor housing 14.

In accordance with our invention, a filter mounting block, represented in general by the reference numeral 56, is rigidly secured to the side wall 19 of the motor housing 14, as seen particularly in FIGS. 3 and 4. The filter mounting block 56 defines an inlet orifice 57 which connects with and receives the upper end 58 of the conduit 42. A lateral filter passage 59 is defined at the front side 60 of the mounting block 56, the axis of the same being generally normal to the axis of the inlet orifice 57 and the conduit 42. An extension passage 61 communicates with the filter passage 59 in general axial alignment therewith and opens into the recess 62 defined by the rear side 63 of the mounting block 56. The extension passage 61 is formed with a smaller diameter than the diameter of the filter passage 59 and receives an elongated filter outlet tube 64 which is connected to the outlet 65 of a conventional filter cartridge 66, the latter being screw threaded at 67 to the front side 60 of the filter mounting block 56. The upper portion 68 of the filter mounting block 56 defines an upwardly opening outlet orifice 69 which is connected by means of the lateral throat 70 to the recess 62. The outlet orifice 69 is enlarged, as at 71, to receive a rotating tubular bushing 72, the latter of which is sealed within the outlet orifice 69 by means of the O-ring 73. For the purpose of providing a cleaning solution spray of filtered cleaning solution, not shown, a flexible spray hose 74 is disposed adjacent the top 3 of the cabinet 2 and is connected by means of a suitable coupling 75 to the tubular bushing 72. The bushing 72 is slotted, as at 76, and a stop pin 77 is carried by the upper portion 68 of the mounting block 56 and is disposed as shown in FIG. 3 so as to provide for the limited angular rotation of the bushing 72 and the spray hose 74 carried thereby.

The fluid supply means 13 further comprises a pump mounting and pump shaft bearing assembly, represented in general by the reference numeral 78, which is rigidly secured intermediate the journal enclosure 21 of the motor housing 14 and the pump 28 so as to dispose the pump shaft 30 in a longitudinally spaced generally, but not positively, coaxial position in relation to the motor output shaft 27. The pump mounting and pump shaft bearing assembly 78 comprises an elongated generally tubular sleeve, represented in general by the reference numeral 79, which is generally concentrically disposed about the motor output shaft 27 and the pump drive shaft 30. The upper end 80 of the sleeve 79 is generally concentrically received within and secured to the journal enclosure 21 by means of the set screw 81, and the lower end 82 of the sleeve 79 is generally concentrically received within and secured by means of the set screw 83 to the fluid inlet passage 84 defined in the generally annular upper portion 85 of the pump housing 31. As seen particularly in FIG. 3, the sleeve 79 defines a plurality of orifices 86 which permit the entry of cleaning fluid, not shown, into the pump 28.

The pump mounting and pump shaft bearing assembly further includes an elongated generally tubular filler sleeve 87 which is generally concentrically received within the upper end 80 of the sleeve 79 and the journal enclosure 21 and is secured thereto by means of the set screw 81, as shown in FIG. 5. It is noted that the upper end 88 of the pump shaft 30 is generally concentrically received in diametrically spaced relationship within the filler sleeve 87 and is journalled therein by means of a pair of axially spaced tubular sleeve bearings 89, that are preferably press fitted into the sleeve 87, and between which bearings is interposed a tubular spacer 90. At its lower end, the filler sleeve 87 is counterbored, as indicated at 91, to receive a conventional annular seal 92 which encompasses the pump shaft 30, see particularly FIG. 5.

In order to provide means for compensating for possible axial misalignment between the motor output shaft 27 and the drive shaft 30, a flexible coupling element, represented in general by the reference numeral 93, is interposed between and connected to the shafts 27, 30. The coupling element 93 preferably comprises an elongated cylinder formed from a plastic material, the lower portion 94 of the coupling element 93 being diametrically reduced and loosely received within the axially upwardly opening bore 95 defined in the upper end 88 of the pump shaft 30. The lower portion 94 of the coupling element 93 is connected to the upper end 88 of the pump shaft 30 for common rotation therewith and for diametric movement relative thereto, said connection being accomplished by means of the diametrically extending wrist pin 96 which is received within the diametric bore 97 defined in the lower portion 94 of the coupling element 93. Also, the opposite ends of the wrist pin 96 are received within the diametrically aligned apertures 99 defined in the upper end 88 of the pump shaft 30. It is noted that the filler sleeve 87 defines opposed diametrically aligned apertures 100 adjacent the wrist pin 96 so as to provide accessibility to the connection provided by the wrist pin 96.

The upper end 101 of the coupling element 93 is enlarged and defines an axially upwardly opening bore 102 which is adapted to receive the output shaft 27 of the motor 22. It is noted that the upper end 101 of the flexible coupling element 93 further defines a circumferentially spaced upwardly opening slot 103 which receives a radially extending axially spaced driving lug 104 so as to provide common rotation between the coupling element 93 and the motor shaft 27 and also to provide axial adjustment therebetween. For the purpose of preventing the entry of large particles of foreign matter into the pump 28, a generally tubular filter screen 105 is generally concentrically received about the lower portion of the sleeve 79 and is dependingly received over the generally annular upper portion 85 of the pump housing 31.

FIG. 8 discloses an alternative embodiment of our invention in which the outlet orifice 69' defined in the upper portion 68' of the filter mounting block 56' is diametrically enlarged throughout its entire length and extends downwardly beyond the lateral throat 70' so as to permit the reception of the tubular bushing 72' to a position adjacent the lateral throat 70'. Further, the tubular bushing 72' is elongated and defines a laterally opening aperture 106 which is alignable with the lateral throat 70'. The bushing 72' is angularly movable between an open position wherein the aperture 106 is axially aligned with the lateral throat 70' and a closed position wherein the aperture 106 faces an adjacent portion of the outlet orifice 69', whereby to provide a valve which may be satisfactorily substituted for the above described valve 46. It should be noted that all other parts and elements of the embodiment of our invention shown in FIG. 8 which are not specifically above described are identical to the corresponding parts and elements shown in FIGS. 1–7, and are represented by the same reference characters with prime marks added thereto.

Having specifically described our invention, the operative simplicity thereof is thought to be easily understandable; however, briefly stated, the operation of our invention resides in placing the machinery parts, not shown, to be cleaned in the cleansing tank 10 after the same has been filled with cleaning solution. Upon energization of the motor 22, the fluid supply means 13 causes circulation of the cleaning solution through the distribution tube 39, as shown by the arrows in FIG. 2, or alternately through the spray hose 74 when the parts to be rinsed are placed in the basket 11. The fluid supply means 13 provided by this invention may be used to a great advantage in parts washers of the type shown and described.

This invention has been thoroughly tested and found to be completely satisfactory for the accomplishment of the above objects; and while we have shown a preferred embodiment thereof, we wish it to be specifically understood that the same may be modified without departure from the scope and spirit of the appended claims.

What we claim is:

1. In a parts washer of the type having a cleaning fluid containing cleansing tank and used for washing dirty machinery parts, the improvement of fluid supply means therefor, said improvement comprising a rotary pump disposed within said cleansing tank and adapted to recirculate the cleaning fluid within said tank, said pump having an elongated and generally upstanding drive shaft, a motor housing secured to said tank and disposed above the fluid level therein and generally vertically above said pump, said motor housing defining a depending journal enclosure, a motor rigidly secured within said housing and having a generally vertically depending output shaft generally axially received within the upper end of said journal enclosure, a pump mounting and pump shaft bearing assembly rigidly secured intermediate said journal enclosure and said pump whereby to dispose said pump shaft in a longitudinally spaced generally coaxial position in relation to said motor output shaft, said pump mounting and pump shaft bearing assembly comprising an elongated generally tubular sleeve generally concentrically disposed about both of said shafts, the upper end of said sleeve being rigidly secured within said journal enclosure and the lower end thereof being rigidly secured to said pump and also being orificed to provide an inlet for said pump, and at least one annular bearing disposed within said sleeve intermediate the ends thereof for journalling said pump shaft in said position relative to said motor shaft, said pump shaft defining an axially opening bore at its upper end, and said fluid supply means further comprising flexible coupling means interposed between and connected to the drive shaft of said pump and the output shaft of said motor and being adapted to compensate for any axial misalignment between both of said shafts, said coupling means comprising an elongated coupling element having its lower end loosely received within the bore of said pump shaft and being connected at said lower end to said pump shaft for common rotation therewith and for diametric movement relative thereto, the upper end of said coupling element being received within the lower end of said journal enclosure and also being connected to the output shaft of said motor for common rotation therewith and for axial movement relative thereto.

2. The structure defined in claim 1 in which said coupling element comprises a non-metallic flexible elongated cylinder, the lower end of which is connected to said pump shaft by means of a diametrically extending journal-forming wrist pin, the upper end of said cylinder defining an axially upwardly opening bore adapted to receive the output shaft of said motor, said upper end of said cylinder defining a circumferentially spaced upwardly opening slot; and in which the output shaft of said motor further comprises a radially extending axially spaced driving lug adapted to be axially slidably received within said slot for driving said coupling element and the drive shaft of said pump upon energization of said motor.

3. The structure defined in claim 2 in which said pump mounting and pump shaft bearing assembly further comprises a rolling-contact bearing disposed intermediate said sleeve and said pump shaft and spaced intermediate the ends of said sleeve, and a sleeve bearing disposed intermediate said sleeve and said pump shaft and disposed adjacent the upper end of said pump shaft and the upper end of said sleeve.

References Cited in the file of this patent
UNITED STATES PATENTS

| | | |
|---|---|---|
| 2,652,844 | Van Hise | Sept. 22, 1953 |
| 2,653,617 | Zaber | Sept. 29, 1953 |
| 2,843,048 | Tapp | July 15, 1958 |
| 2,851,956 | Lung | Sept. 16, 1958 |
| 2,891,481 | Franklin | June 23, 1959 |
| 2,918,927 | Clearman | Dec. 29, 1959 |